(12) United States Patent
Bourcier et al.

(10) Patent No.: US 11,708,063 B2
(45) Date of Patent: Jul. 25, 2023

(54) HYBRID ELECTRIC VEHICLE AND METHOD OF OPERATING ENGINE OF THE SAME

(71) Applicants: HYUNDAI MOTOR COMPANY, Seoul (KR); KIA CORPORATION, Seoul (KR)

(72) Inventors: Mark Bourcier, Canton, MI (US); Nahm Roh Joo, Yongin-si (KR); Antowan Zyada, Livonia, MI (US); Shengrong Zhu, Ann Arbor, MI (US); Philip Zoldak, ASuperior Township, MI (US)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/464,383

(22) Filed: Sep. 1, 2021

(65) Prior Publication Data

US 2023/0066607 A1 Mar. 2, 2023

(51) Int. Cl.
*B60W 20/10* (2016.01)
*B60W 10/08* (2006.01)
*B60W 10/06* (2006.01)

(52) U.S. Cl.
CPC ............ *B60W 20/10* (2013.01); *B60W 10/06* (2013.01); *B60W 10/08* (2013.01); *B60W 2510/0642* (2013.01); *B60W 2510/244* (2013.01)

(58) Field of Classification Search
CPC ...... B60W 20/10; B60W 10/06; B60W 10/08; B60W 2510/0642; B60W 2510/244
See application file for complete search history.

(56) References Cited

U.S. PATENT DOCUMENTS

| | | |
|---|---|---|
| 7,481,185 B1 | 1/2009 | Park et al. |
| 7,806,210 B2 | 10/2010 | Proietty et al. |
| 8,276,555 B2 | 10/2012 | Kang et al. |
| 8,374,771 B2 | 2/2013 | Falkenstein |
| 9,925,975 B2 | 3/2018 | Leone et al. |

(Continued)

FOREIGN PATENT DOCUMENTS

JP 3933012 B2 6/2007

*Primary Examiner* — George C Jin
(74) *Attorney, Agent, or Firm* — Lempia Summerfield Katz LLC

(57) ABSTRACT

A hybrid electric vehicle (HEV) for multiple operation modes includes: a gasoline diffusion flame (GDF) combustion engine configured to perform gasoline diffusion flame combustion; a motor-generator operatively connected to the GDF combustion engine and configured to selectively drive the HEV with electric power of a battery or generate electric power to charge the battery; and a multi-mode controller including a processor and configured to receive operating conditions of the GDF combustion engine and the motor-generator and define a plurality of mode operating regions based on the received operating conditions. In particular, the plurality of mode operating regions includes: an electric vehicle (EV) only mode operating region, a GDF mode operating region where the GDF combustion engine operates and drives the HEV while the motor-generator stops, and a GDF+EV mode operating region where the motor-generator assists the operation of the GDF combustion engine to drive the HEV.

7 Claims, 9 Drawing Sheets

(56) References Cited

U.S. PATENT DOCUMENTS

| | | | |
|---|---|---|---|
| 10,167,809 B1* | 1/2019 | Domenech-Llopis | ................. F02D 41/403 |
| 10,550,790 B2* | 2/2020 | Ravi | ............. F02D 41/3076 |
| 2002/0017269 A1* | 2/2002 | zur Loye | ............. F02D 35/025 123/305 |
| 2008/0276913 A1* | 11/2008 | Zubeck | ................ B60W 10/08 123/549 |
| 2011/0029177 A1* | 2/2011 | Yeung | ................... B60K 6/442 180/65.21 |
| 2012/0035793 A1 | 2/2012 | Kang et al. | |
| 2013/0096750 A1 | 4/2013 | Kim | |
| 2016/0069291 A1* | 3/2016 | Ge | ....................... B60W 20/15 701/103 |
| 2016/0153329 A1* | 6/2016 | Kim | ........................ B60K 6/48 60/274 |
| 2017/0174207 A1* | 6/2017 | Nishidono | .......... F02D 41/3094 |
| 2019/0178115 A1 | 6/2019 | Son et al. | |
| 2020/0223424 A1* | 7/2020 | Won | ........................ B60K 6/26 |

\* cited by examiner

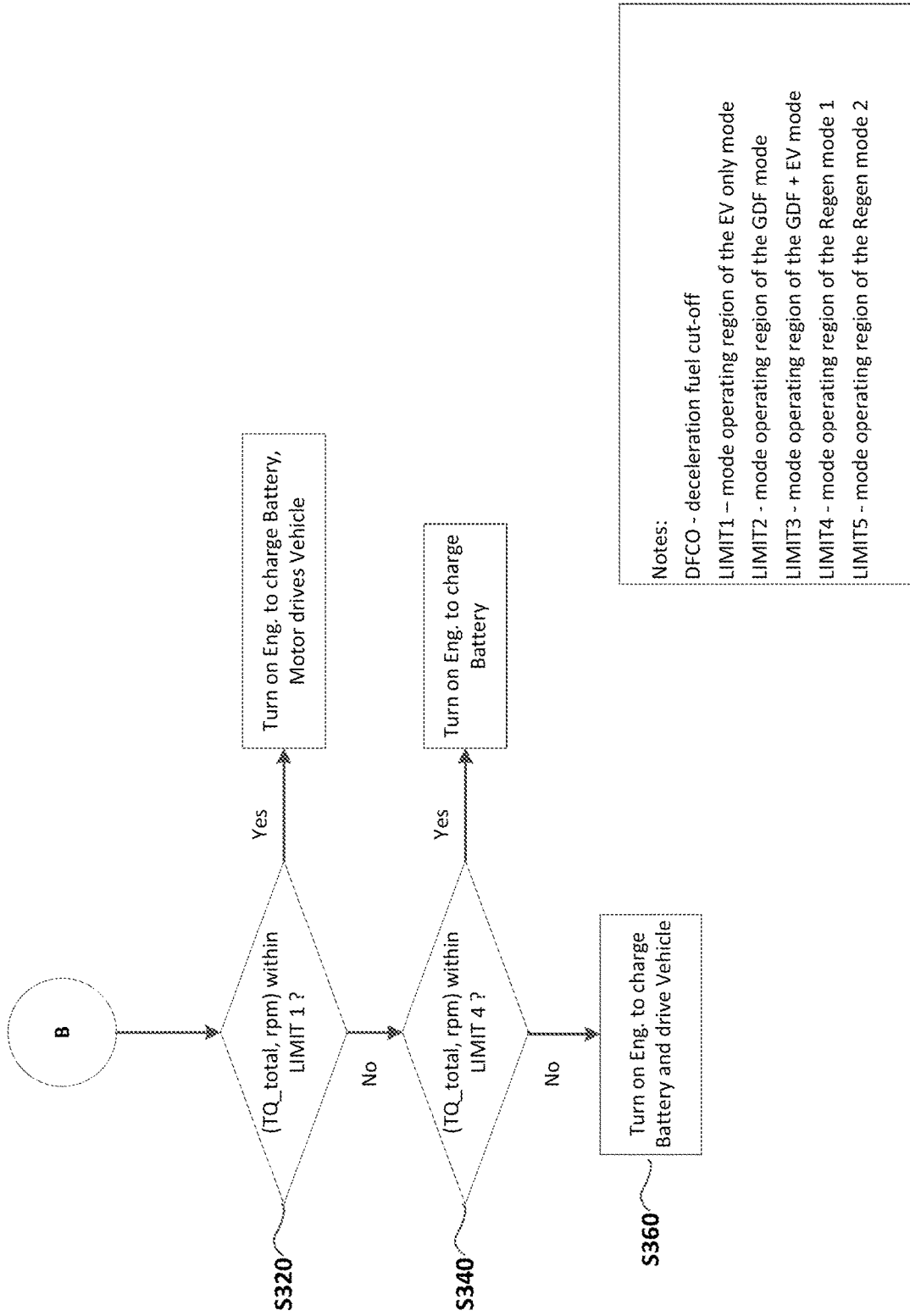

HYBRID ELECTRIC VEHICLE AND METHOD OF OPERATING ENGINE OF THE SAME

GOVERNMENT LICENSE RIGHTS

This invention was made with government support under Award No. DE-EE0008478 awarded by U.S. Department of Energy (DOE). The government has certain rights in the invention.

FIELD

The present disclosure relates to a hybrid electric vehicle using a gasoline engine and a motor so as to produce a driving force of the vehicle.

BACKGROUND

The statements in this section merely provide background information related to the present disclosure and may not constitute prior art.

In general, a spark-ignition (SI) engine introduces fuel and air in a cylinder during an intake stroke, and then the air/fuel mixture is compressed in a compression stroke and ignited by a spark generated by a spark plug in a combustion chamber formed in the cylinder of the engine.

As one way to directly supply the fuel in the cylinder of the SI engine, a direct injector has been used to increase in-cylinder stratification resulting in high power output and improved fuel efficiency compared to a port fuel injection (PFI) engine, which is known as a direct injection (GDI) engine. The GDI engine is designed to directly inject fuel into the combustion chamber such that the vaporized fuel directly injected into the combustion chamber has a cooling effect and increases a volumetric efficiency, thereby allowing a higher compression ratio and improved fuel efficiency.

Such SI engines can operate in a variety of different combustion modes, including a homogeneous SI combustion mode and a stratified-charge SI combustion mode. SI engines can also be switched to operate in a homogeneous-charge compression-ignition (HCCI) combustion mode, also referred to as controlled auto-ignition combustion under predetermined temperature and pressure conditions and under various speed/load operating conditions. The HCCI combustion mode consists of a distributed, flameless, auto-ignition combustion process that is controlled by oxidation chemistry.

An engine operating in the HCCI combustion mode has a cylinder charge that is preferably homogeneous in composition, temperature, and residual exhaust gases at intake valve closing time. The HCCI combustion is a distributed kinetically-controlled combustion process with the engine operating at a dilute air/fuel mixture, i.e., lean of a stoichiometric air/fuel point, with relatively low peak combustion temperatures, resulting in low NOx emissions. The homogeneous air/fuel mixture minimizes occurrences of rich zones that form smoke and particulate emissions.

The HCCI combustion using gasoline has shown both high efficiency and low emissions of NOx and Soot by using an early injection, however we have discovered that the HCCI combustion is difficult to control combustion phasing because the auto-ignition process is dependent on chemical kinetics and increasing load leads to excessive in-cylinder pressure rise rates, thus limiting its applicability across the full operating range. Partially premixed compression ignition (PPCI) utilizes multiple direct injections during the compression stroke to mitigate pressure rise rates (PRR) but ultimately this mode is chemical kinetics driven and is increasingly difficult to modulate combustion phasing at high loads, thus limiting operation at high loads and wider speeds.

SUMMARY

We have found that one way to take advantage of the benefits of SI, HCCI and PPCI combustion modes and to mitigate the challenges is to develop an engine that is capable of operating in all combustion modes (i.e., Multi-mode engine). The engine could be started in the SI mode and then transitioned into the HCCI mode for part-load operation and then transitioned into the PPCI mode for higher load operation. Although the multi-mode engine is able to take advantage of the fuel economy benefits of each of the respective combustion modes mentioned earlier, it brings with it added complexity and challenges of multi-mode engine operations, controls for mode-switching and calibration difficulties. In addition, we have found that the multi-mode combustion operation in the gasoline engines has higher system complexity and unresolved transition issues (e.g., torque drop) between the modes that consumers would not tolerate as well as associated control costs.

The present disclosure relates to a hybrid electric vehicle having a gasoline engine performing gasoline diffusion flame (GDF) combustion in a high engine load operation region such that the engine operates more energy efficiently and robustly, without a torque drop during a combustion mode transition.

In one form of the present disclosure, a hybrid electric vehicle (HEV) for multiple operation modes includes: a gasoline diffusion flame (GDF) combustion engine which performs gasoline diffusion flame combustion; a motor-generator that is operatively connected to the GDF combustion engine and selectively drives the HEV with electric power of a battery or generates electric power to charge the battery; and a multi-mode controller which receives operating conditions of the GDF combustion engine and the motor-generator. In particular, the multi-mode controller may define a plurality of mode operating regions based on the received operating conditions including engine loads and engine speeds. In particular, the plurality of mode operating regions include: an electric vehicle (EV) only mode operating region, a GDF mode operating region where the GDF combustion engine operates and drives the HEV while the motor-generator stops, and a GDF+EV mode operating region where the motor-generator assists the operation of the GDF combustion engine to drive the HEV.

In another form of the present disclosure, a method of operating a hybrid electric vehicle (HEV) in multiple modes is disclosed. The method includes: driving, with a controller, the HEV in an electric vehicle (EV) only mode in a first mode operating region defined by a first engine load and a first engine speed when a state of charge (SOC) of a battery is greater than a predetermined SOC value; causing, with the controller, the GDF combustion engine to perform a four-stroke engine cycle and a GDF combustion engine operation in a second mode operating region defined by a second engine load and a second engine speed, wherein the second engine load is greater than the first engine load, and the GDF combustion engine operation includes: injecting a first proportion of the fuel as a pilot injection and a second proportion of the fuel as a main injection following the pilot injection; and causing, with the controller, a motor-generator to assist the GDF combustion engine operation in a third mode operation region defined by a third engine load and a third engine speed, wherein the third engine load is greater than the first engine load and the third engine speed is greater than the second engine speed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 6A:
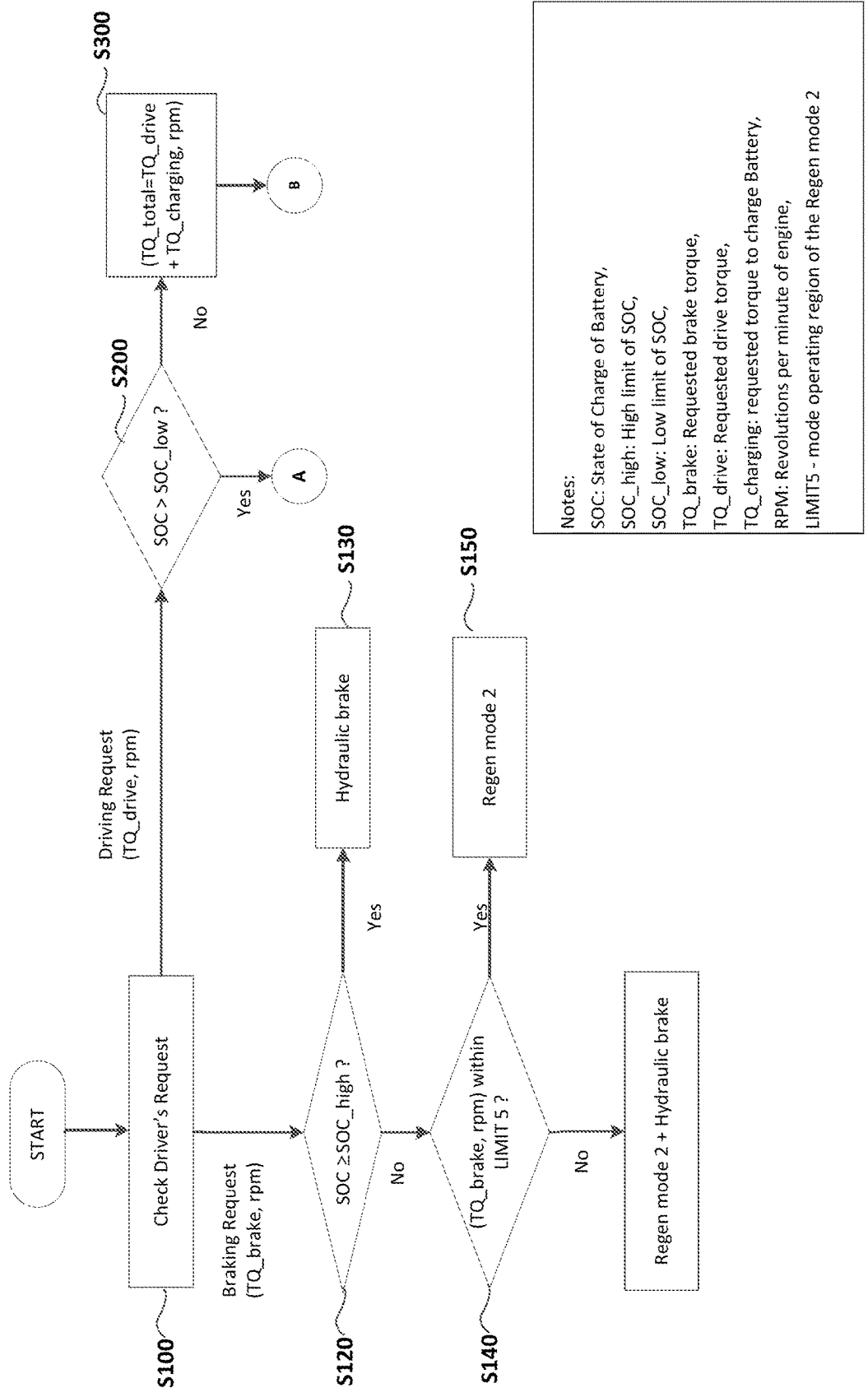
Figure 6B:
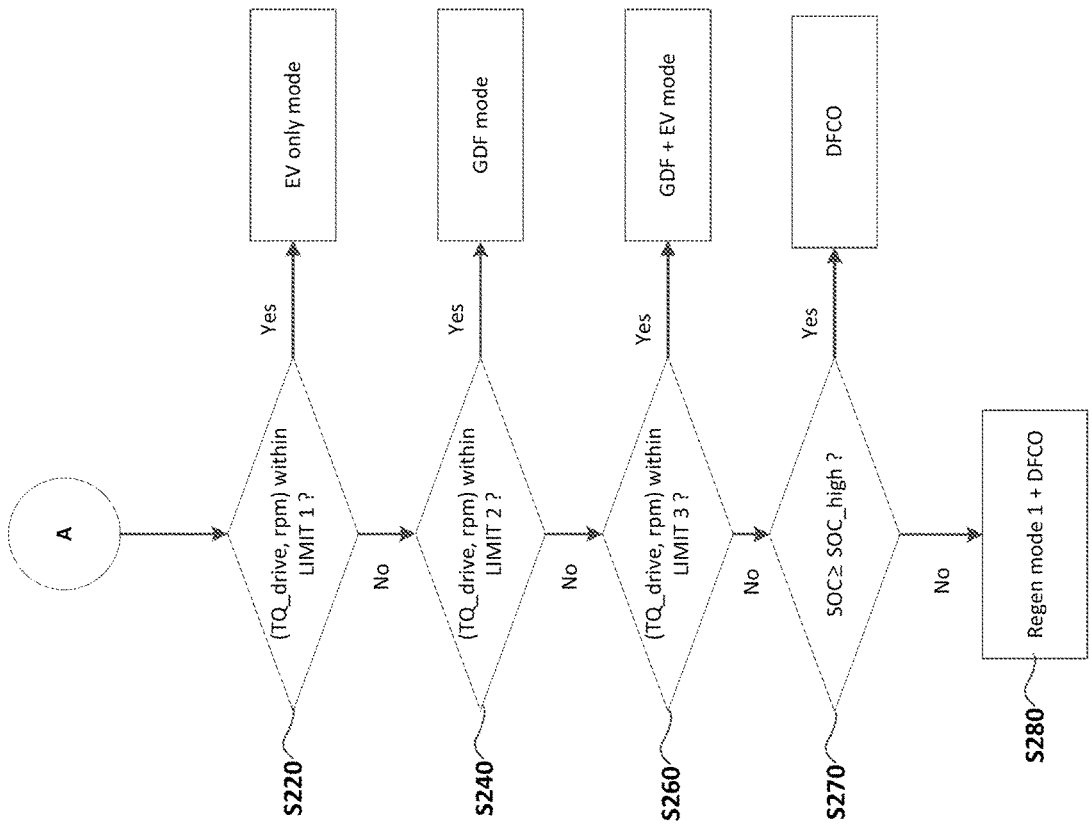
Figure 7:
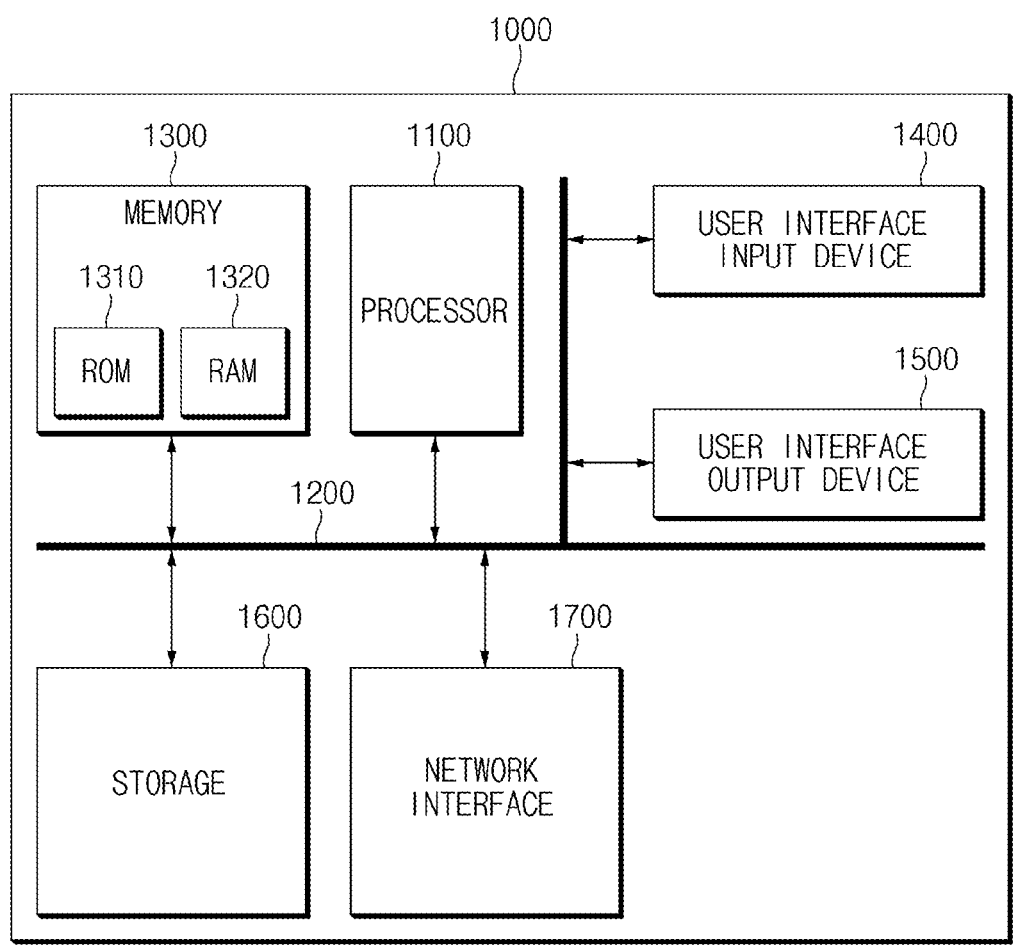

FIGS. 6A, 6B and 6C are flowcharts illustrating exemplary processes of determining a mode operating region among a plurality of mode operating regions and controlling the HEV in the determined mode operating region in some forms of the present disclosure; and FIG. 7 illustrates a computing system which may be implemented with the multi-mode controller or other controllers in some forms of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

This present disclosure does not describe all components of forms, and general information in the technical field to which the present disclosure belongs or overlapping information between the forms will not be described.

It will be understood that, although the terms first, second, third, etc. may be used herein to describe various components or threshold values, these components and threshold values should not be limited by these terms. These terms are only used to distinguish one component or one value from another.

Reference numerals used in operations are provided for convenience of description, without describing the order of the operations, and the operations can be executed in a different order from the stated order unless a specific order is definitely specified in the context.

Hereinafter, the operation principle and exemplary forms of the present disclosure will be described with reference to the accompanying drawings. As publicly known in the art, some of exemplary forms may be illustrated in the accompanying drawings from the viewpoint of function blocks, units and/or modules. Those skilled in the art will understand that such blocks, controllers, units and/or modules are physically implemented by electronic (or optical) circuits such as logic circuits, discrete components, processors, hard wired circuits, memory devices and wiring connections.

When the blocks, controller, units and/or modules are implemented by processors or other similar hardware, the blocks, units and modules may be programmed and controlled through software (for example, codes) in order to perform various functions discussed in this specification. Furthermore, each of the blocks, units, controllers, and/or modules may be implemented by dedicated hardware or a combination of dedicated hardware for performing some functions and a processor for performing another function (for example, one or more programmed processors and related circuits).

Figure 1:
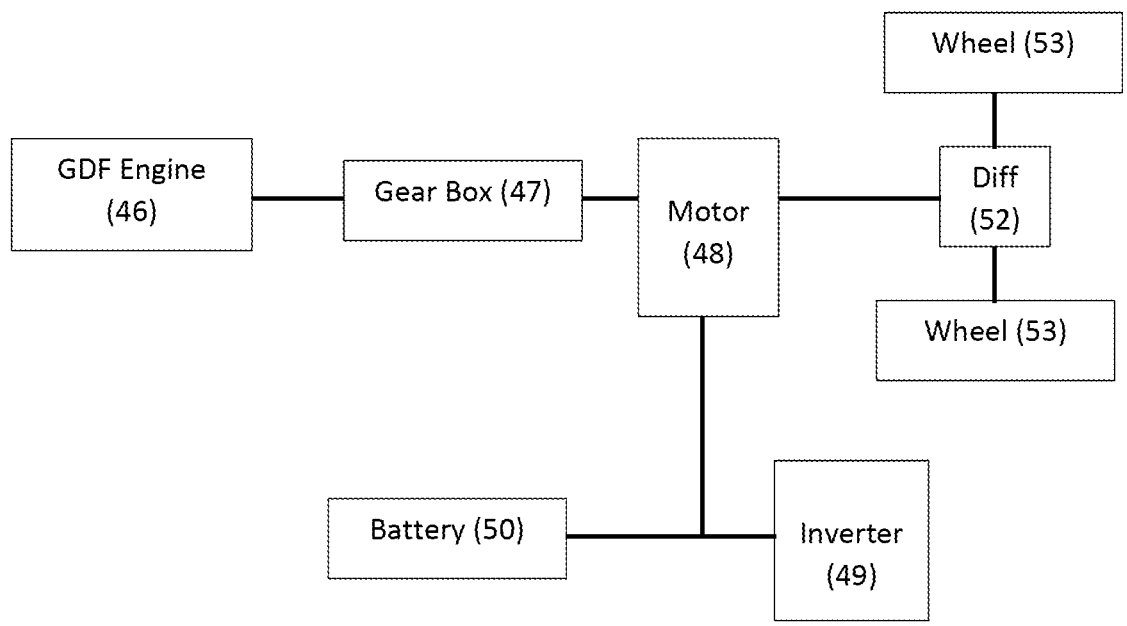
FIG. 1 is a schematic block diagram showing a hybrid electric vehicle 100 (HEV) in one form of the present disclosure.

FIG. 1 is a schematic block diagram showing a hybrid electric vehicle 100 (HEV) in one form of the present disclosure. The HEV includes: a gasoline diffusion flame (GDF) combustion engine 46, a gearbox 47 connected to the GDF combustion engine, a motor-generator 48 connected to the gearbox and electrically connected to a battery 50 and an inverter 49, and a differential gear 52 which is coupled to the motor-generator and delivers a driving torque from the motor-generator to drive wheels 53 of the HEV. In one form, the motor-generator is connected to the differential gear 52 via a drive shaft 51.

Figure 2:
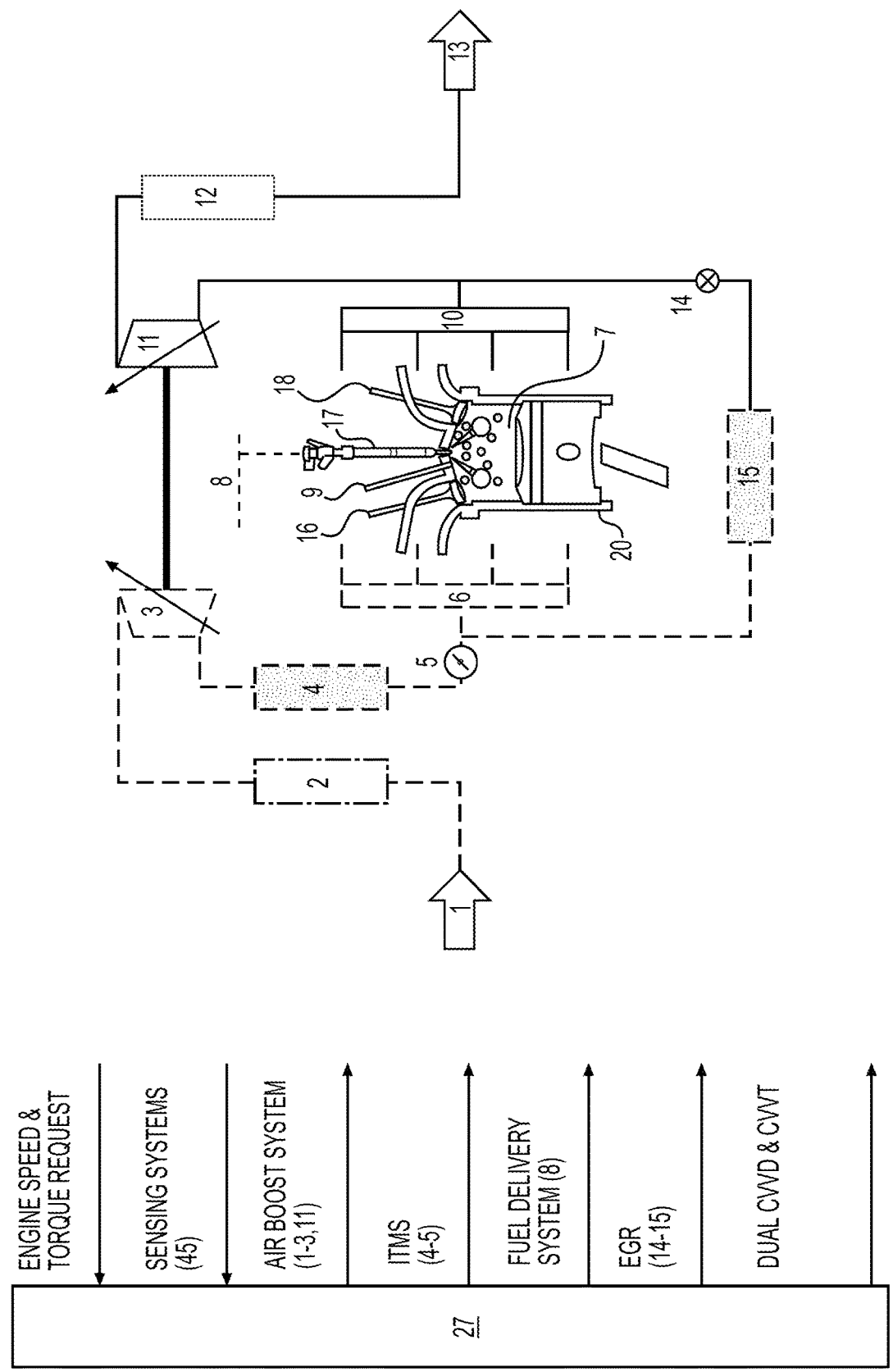
FIG. 2 is a schematic block diagram illustrating the GDF combustion engine and various systems associated with the operation of the GDF combustion engine in one form of the present disclosure.

FIG. 2 is a schematic block diagram illustrating the GDF combustion engine and various systems associated with the operation of the GDF combustion engine in one form of the present disclosure. In some forms of the present disclosure, the various systems include: an air boost system (1-3, 11-12), an intake air management system (ITMS) 4-5; a fuel delivery system 8; an exhaust gas recirculation (EGR) system (14, 15); a Dual CVVD (continuous variable valve duration) & CVVT (Continuous variable valve timing) mechanisms for intake and exhaust valves (16, 18); a sensing system 45 including a plurality of sensors to detect and generate data associated with operating conditions of the HEV 100 and the GDF combustion engine 46. Those systems are operatively connected to a multi-mode controller 27 and exchange data to operate the HEV 100 and the GDF combustion engine 46.

In one form, the multi-mode controller 27 includes a processor and a memory storing a set of instructions to be executed by the processor, and may receive data associated with operating conditions of the HEV 100 and the GDF combustion engine 46. For example, the multi-mode controller 27 may receive an engine speed (e.g., revolutions per minute "RPM"), a torque request desired to drive the HEV, and detected signals from the sensing system 45 that includes a combustion pressure sensor 9 configured to detect a combustion pressure in a combustion chamber in a cylinder of the GDF combustion engine 46.

Referring to FIG. 2, the fuel delivery system 8 includes a high pressure direct injector 17 to directly inject fuel (e.g., gasoline) into the combustion chamber 7 of the GDF combustion engine 46. The fuel delivery system 8 provides a fuel pressure up to 1800 bar by a high pressure pump and the high pressure direct injector 17 may inject the fuel into the combustion chamber 7 at 1000 bar or greater than 1000 bar. In particular, the GDF combustion engine 46 operates with gasoline diffusion flame combustion utilizing two or more late direct injections in one engine cycle. For example, the high pressure direct injector 17 may directly inject a first proportion of gasoline type fuel (a pilot injection) and a second proportion of the gasoline fuel (a main injection) following the pilot injection.

Figure 3:
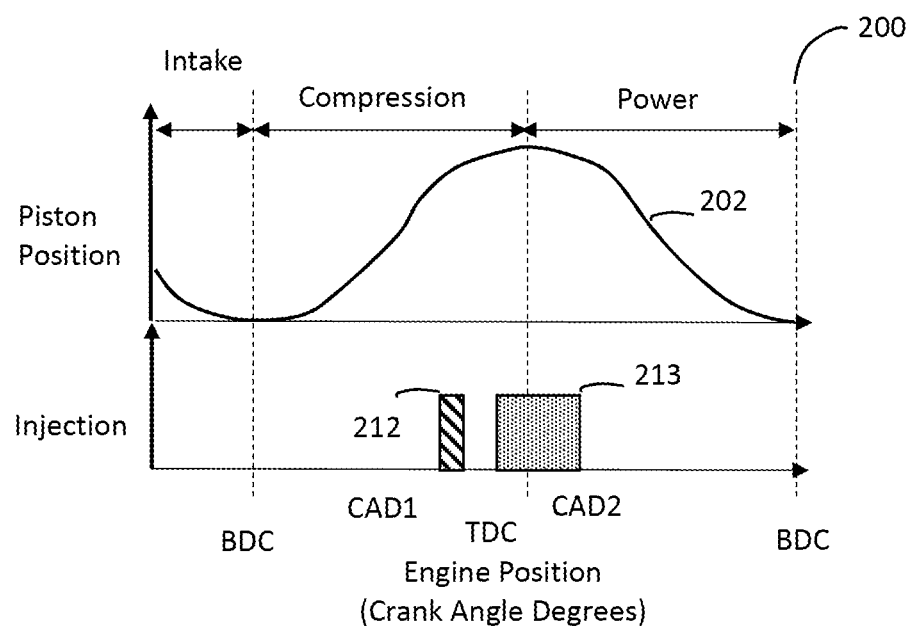
FIG. 3 is a graph illustrating a GDF fuel injection profile for a four-cylinder engine cycle in another form of the present disclosure.

FIG. 3 is a graph illustrating a GDF fuel injection profile for a four-cylinder engine cycle. As illustrated in FIG. 3, the pilot injection occurs close to a top dead center (TDC) but before the TDC in a compression stroke, and the main injection starts before a power stroke and ends after the TDC in the power stroke such that the first proportion of the fuel is ignited through compression ignition and generates a gasoline diffusion flame. The generated gasoline diffusion flame ignites the second proportion of the fuel and thus generate power to drive the GDF combustion engine.

In particular, in order to induce the GDF combustion through the pilot and main injections, several conditions should be met, such as injecting the gasoline type fuel at least 200 bar, supplying pressurized air at least 1.3 bar through an intake manifold 6, and having a high compression ratio (diesel like) greater than CR13.5:1 at the TDC, such that sufficient compression pressure and temperature are provided at the top dead center (TDC).

Referring to FIG. 3, a curve 202 depicts piston positions (along the y-axis) with reference to their location from the top dead center (TDC) and/or bottom dead center (BDC), and further with reference to their location within the four strokes (intake, compression, power and exhaust) of an engine cycle. The map 200 specifically depicts only the compression and power strokes to demonstrate the fuel injections (i.e., the pilot and main injections) occurring at or around the TDC piston position between the compression and power strokes. In one form, the pilot injection 212 occurs at CAD1 (Crank Angle Degree 1) towards the end of the compression stroke but before the main injection 213. The main injection 213 starts right before the power stroke and ends at CAD2 after the TDC in the power stroke.

The fuel injection profile illustrated in FIG. 3 is one form of the present disclosure, and the CAD1 and CAD2 can be changed or adjusted during calibration of the GDF engine. For example, a test may be performed to determine an amount of the pilot injection by varying the pilot fuel quantity injected without no main fuel quantity. A point where the pilot fuel auto-ignition is detected in the heat release trace is the maximum pilot fuel quantity that can be injected at that engine speed and engine load point. As another exemplary forms, a quantity of fuel injected via the pilot (first) injection during the compression stroke accounts for approximately from 25% to 35% of a total fuel quantity which is supplied per cycle of each cylinder. For another example, the first injection is performed in a range from approximately 1100 to 1200 μs before starting the second (main) injection, and the injected fuel quantity during the first injection is from approximately 1 mg to 2 mg.

Figure 4:
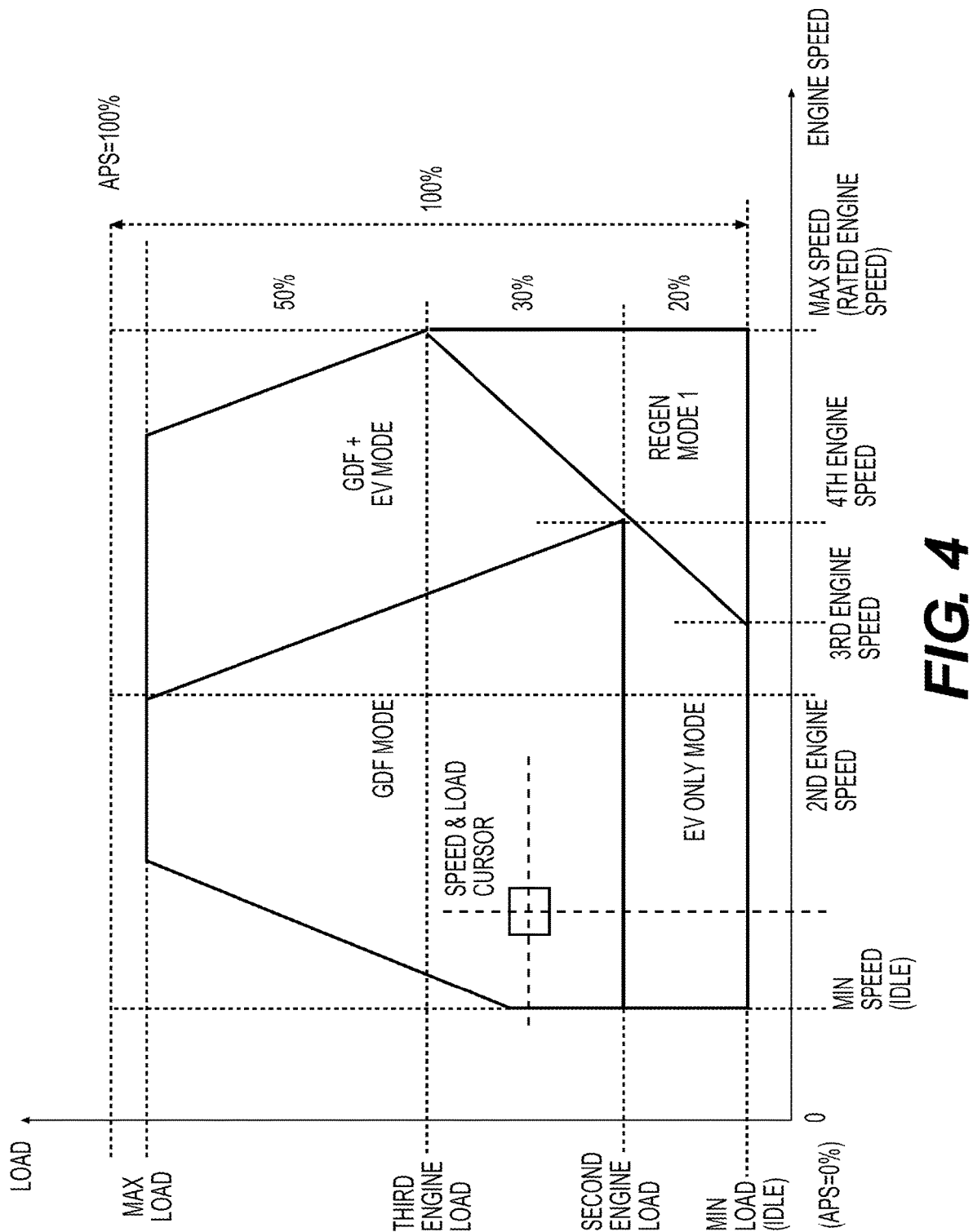
FIG. 4 is a schematic block diagram showing a plurality of mode operating regions classified based on engine load (e.g., engine torque) and engine speed of the GDF engine in one form of the present disclosure.

FIG. 4 is a schematic block diagram showing a plurality of mode operating regions classified based on engine load (e.g., engine torque) and engine speed of the GDF engine in one form of the present disclosure. As an exemplary form, the plurality of mode operating regions may include: an EV mode operating region where the motor-generator 48 drives the HEV ("EV only mode"); a GDF mode operating region where the GDF combustion engine 46 operates and drives the HEV while the motor-generator 48 stops ("GDF mode"); a GDF+EV mode operating region where the motor-generator 48 assists the operation of the GDF combustion engine ("GDF+EV mode"); a Regeneration mode 1 operating region where the GDF combustion engine stays on and runs the motor-generator 48 to generate electric power and thus charge the battery 50 when the SOC of the battery is lower than a predetermined low SOC value ("Regen Mode 1"). For example, when the SOC of the battery is lower than 20% of the full SOC of the battery, it may be determined that the SOC of the battery is low and the HEV operates in the Regen Mode 1 to charge the battery 50.

As described above, the multi-mode controller 27 receives data associated with operating conditions of the HEV 100 and the GDF combustion engine 46. The data includes an engine speed and an engine load (e.g., engine torque "TQ") of the GDF combustion engine desired to drive the HEV, and the multi-mode controller 27 determines an operating region among the plurality of mode operating regions based on the engine speed and engine load.

As illustrated in FIG. 4, when the engine speed is between the minimum speed (idle speed) and a second predetermined engine speed and the engine load is between a second predetermined load and a third predetermined load, the multi-mode controller 27 determines to operate the HEV in the GDF mode. The "Speed & Load cursor" in FIG. 4 represents a current operating point on the speed-engine load map. In the GDF mode, the motor-generator 40 stops and only the GDF engine 26 operates. This GDF mode is very efficient in the mid-to-high engine load region but suffers from long ignition delay at a low engine load region due to the low reactivity (i.e., a high octane value of fuel) of a conventional pump gasoline. In some forms of the present disclosure, the HEV travels in the EV only mode where the motor-generator 48 drives the HEV without the power generation from the GDF engine 46 when the multi-mode controller 27 determines the operating condition of the HEV as a low engine load condition. In one form, the low engine load condition includes the engine start, idling and engine load which is less than the second predetermined load.

Additionally, at high speeds, the GDF mode is limited by a maximum fuel pump pressure of a gasoline pump that pressurizes the gasoline fuel. In order to improve fuel efficiency at high speeds of the HEV, the motor-generator 48 operates and assists the operation of the GDF engine 46 (i.e., the GDF+EV mode). For example, the multi-mode controller 27 may determine the current operating condition as the GDF+EV mode among the plurality of mode operating regions when the engine speed is greater than the fourth predetermine engine speed and the engine load is greater than the second predetermined engine load. Driving conditions (e.g., road condition, vehicle weight) of the HEV and demand inputs (e.g., acceleration, deceleration) from a driver of the HEV are continuously input to the multi-mode controller 27 which identifies a desired mode operating region among the plurality of mode operating regions.

As one form of the present disclosure, FIG. 4 illustrates the mode operating regions (e.g., EV only mode, GDF mode, GDF+EV mode and Regen Mode 1) classified, based on the predetermined engine speeds and engine loads. However, the engine speed-load map in FIG. 4 is an exemplary form and thus the present disclosure is not limited to this specific form. Instead, one of ordinary skill in the art may modify and adjust the predetermine values (i.e., engine speed and engine load) to define each mode operating region through experiments to provide better engine performance and improved fuel efficiency.

With reference to FIG. 4, the multi-mode controller 27 may determine a first mode operating region (namely, EV only mode operating region or a low-load condition) when the engine demand load is between a first predetermined load (e.g., a minimum load or a minimum engine torque) and a second predetermined load, and the engine speed is between the minimum speed (e.g., idle speed, or 800 rpm) and the fourth predetermined engine speed (e.g., 4000 rpm); a second mode operating region (namely, GDF mode operating region) where the engine demand load is greater than the second predetermined load and equal to or less than the maximum load and the engine speed is between the minimum speed (e.g., 800 rpm or less) and the fourth predetermined engine speed (e.g., 4000 rpm); and a third mode operating region (namely, GDF+EV mode operating region) where the engine demand load is greater than the second predetermined load and less than the maximum predetermined load and the engine speed is between a second predetermined speed (e.g., 3000 rpm) and the maximum speed (e.g., 5000 rpm). In particular, the motor-generator 46 operates to assist the operation of the GDF engine in the GDF+EV mode operating region, whereas the motor-generator 46 does not operate and only the GDF engine operates in the GDF mode operating region.

In addition, the multi-mode controller 27 may further determine a fourth mode operating region (namely, Regeneration mode 1 operating region) when the engine demand load is less than the third predetermined load and continues to the minimum engine load and the engine speed is between the third predetermined speed (e.g., 3500 rpm) and the maximum speed. In the regeneration mode 1 operating region (Regen Mode 1), the GDF engine 46 stays on to charge the battery 50 with a minimum drive torque from the GDF engine when the SOC of the battery is lower than a threshold value (namely, a low SOC condition). In the present disclosure, the first predetermined load (e.g., the minimum engine torque) is measured when an input from an acceleration position sensor (APS) is zero "0," and FIG. 4 schematically illustrates relative proportions of the second to maximum predetermined loads and the predetermined engine speeds in the map. However, the present disclosure is not limited to this specific form.

Figure 5:
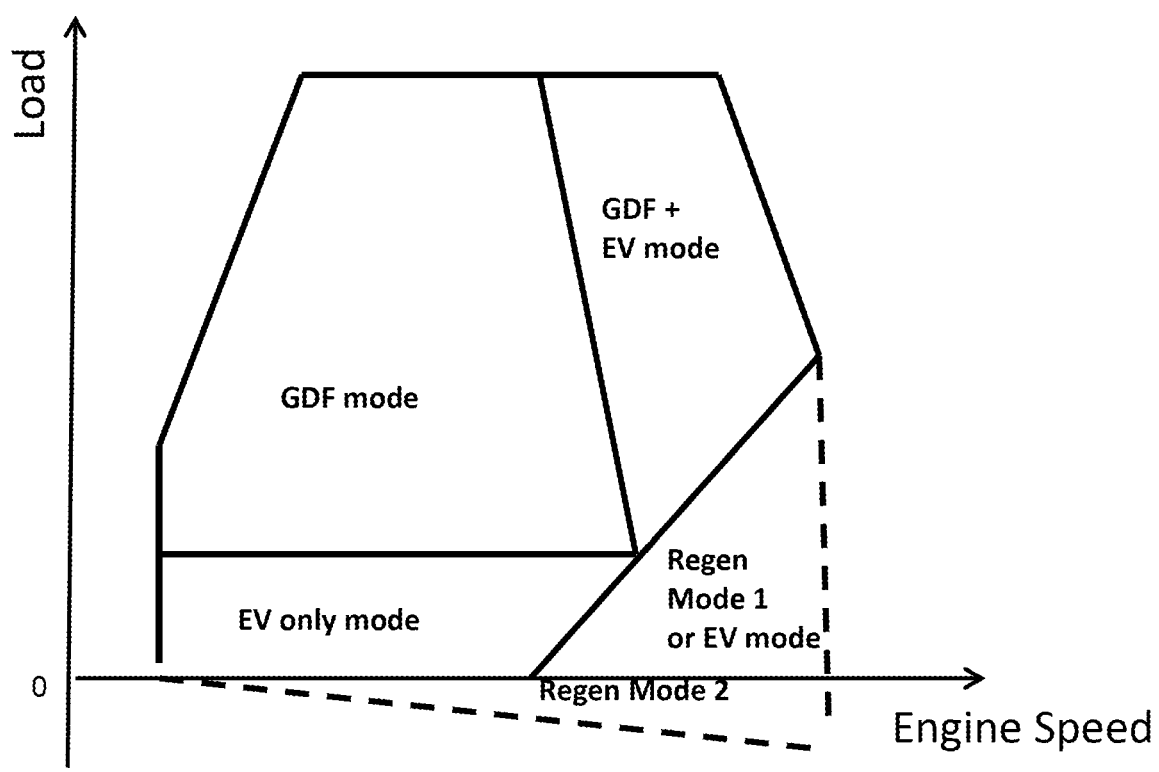
FIG. 5 illustrates multiple mode operating regions in another form of the present disclosure.

In another form, FIG. 5 illustrates the mode operating regions (e.g., EV only mode, GDF mode, GDF+EV mode, Regen Mode 1 and Regen Mode 2 operating regions) classified based on the predetermined engine speeds and engine loads. The mode operating regions in FIG. 5 are similar to the mode operating regions illustrated in FIG. 4 except for the regeneration mode 2 (Regen Mode 2) operating region. Unlike the Regen mode 1 operating region, in the Regen mode 2 operating region (namely, regenerative braking mode), a fuel cut command is performed to stop the fuel supply to the GDF engine 46 while the vehicle momentum is converted to electric power by using the motor-generator which operates as a generator, and the generated electric power is stored in the battery 50 such that the energy efficiency is improved.

FIGS. 6A, 6B and 6C are flowcharts illustrating exemplary processes of determining a mode operating region among a plurality of mode operating regions and controlling the HEV in the determined mode operating region in some forms of the present disclosure.

Referring to FIG. 6A, when the multi-mode controller 27 receives an input (e.g., a braking request, a driving request) from a driver of the HEV 100 and the engine rpm in step S100, the multi-mode controller 27 detects a State of Charge (SOC) of the battery 50 and determines whether the SOC of the battery is equal to or greater than a predetermined high SOC value in step S120. For example, the predetermined high SOC value may be 80% of the full SOC of the battery. If the SOC of the battery is equal to or greater than 80% of the full SOC, the multi-mode controller 27 determines that the battery does not need to be charged. When the braking request (TQ_brake) is received in step S100 and the battery is in the high SOC status, the HEV is controlled to be decelerated according to the braking request without further charging the battery in step S130.

Meanwhile, when the SOC of the battery is less than the predetermined high SOC value in step S120, the multi-mode controller 27 turns off the EV mode and controls the HEV in the Regen Mode 2 based on the engine speed (i.e., rpm) and engine loads (i.e., TQ_brake). In the Regen Mode 2, the fuel supply to the GDF engine 46 is stopped while the vehicle momentum is converted to electric power by using the motor-generator which operates as a generator, and the generated electric power is stored in the battery 50 (See, steps 3140 and S150).

When the driving request (i.e., TQ_drive) is received in step S100, the multi-mode controller 27 determines whether the SOC of the battery 50 is greater than a predetermined low SOC value in step S200. For example, the predetermined low SOC value may be 20% of the full SOC of the battery. If it is determined that the SOC of the battery 50 is greater than the predetermined low SOC value in step S200, the multi-mode controller 27 determines whether the operating condition of the HEV is in the EV only mode operating region based on the engine load (TQ_drive) and engine speed (rpm) in step S220. Once the EV only mode operating region is determined, the HEV operates in the EV only mode. In the EV only mode, the GDF engine 46 is turn off and the motor-generator 48 runs with the electric power supplied from the battery 50 to drive the HEV 100.

As the engine load increases (e.g., the requested torque increases), the multi-mode controller 27 determines if the operating condition of the HEV enters the GDF mode operating region in step S240. In response to determining that the HEV enters the GDF mode operating region, the multi-mode controller 27 turns off the EV mode and starts the GDF combustion engine 46 with the gasoline diffusion flame combustion. As discussed above, the gasoline diffusion flame combustion is performed with two or more direct injections (e.g., the pilot injection and the main injection) in one engine cycle. The proportion of the gasoline fuel injected via the pilot injection may be equal to or less than the proportion of the gasoline fuel injected via the main injection. The HEV may have a power split module (PSM) in the form of a hardware (e.g., a processor, a memory) or software to determine the most efficient fuel split for the gasoline diffusion flame combustion based on the operating condition of the HEV. In one form, the PSM may be integrated with the multi-mode controller 27.

In the GDF mode, the multi-mode controller 27 may send control signals to the Dual CVVD (continuous variable valve duration) & CVVT (continuous variable valve timing) mechanisms to adjust a valve overlap by controlling opening and closing timings and duration of intake and exhaust valves (16, 18). For the GDF engine operation, the ITMS controls charged intake air flowing through a cooler 4 and a control valve 5. As illustrated in FIG. 2, aft 1 flows through an air filter 2 and is compressed by a turbocharger 3 coupled with an e-Turbo 11 which is run by the pressure of the exhaust gas 13 discharged from the exhaust manifold 10 to the outside through a catalyst converter 12. A portion of the exhaust gas may be mixed with the intake air via the EGR system having an EGR cooler 15 and an EGR control valve 14. In one form, the exhaust gas is mixed with the charged air having passed the control valve 5 and supplied to the cylinder (i.e., the combustion chamber 7) via the intake manifold 6.

When the engine load (i.e., TQ_drive) and the engine speed information indicate that the HEV enters the GDF+EV mode operating region and the multi-mode controller 27 determines the same in step S260, the multi-mode controller 27 determines the driving power split between the GDF combustion engine 46 and the motor-generator 40 to drive the HEV in a way of improving the fuel efficiency. In other words, the motor-generator runs to assist the operation of the GDF engine to avoid any torque drop during the mode switch between the operation modes (e.g., GDF, EV only and GDF+EV modes), such that driving performance and fuel efficiency are improved at high speeds. The motor-generator supplements the driving power for the HEV in operating conditions where the GDF engine suffers ignition delay due to low reactivity (e.g., rich condition) or the operation of the GDF engine is limited by the maximum fuel pressure generated by the fuel delivery system 8.

In step S270, the multi-mode controller 27 compares the current SOC of the battery 50 with the predetermined high SOC value when the operating region based on the demanded drive torque (TQ_drive) and the engine speed does not belong to any of the above-mode operating regions (i.e., the EV only mode operating region, the GDF mode operating region and the GDF+EV mode operating region) in order to proceed to either a "DFCO" control or a "Regen mode 1+DFCO" control. Here, "DFCO" stands for deceleration fuel cut-off. Under the DECO control, the fuel supplied to the GDF engine is cut while allowing the drive wheels 53 to keep the GDF engine 46 running when the gearbox 47 is in-gear condition. When the SOC of the battery is determined as being less than the predetermined high SOC value (i.e., SOC_low<SOC<SOC_high) in step S270, the multi-mode controller 27 controls the motor-generator 48 to charge the battery in the Regeneration mode 1 while performing the DECO control.

Referring to FIGS. 6A and 6C, when the SOC of the battery 50 is equal to or less than the predetermined low SOC value (SOC_low) in step S200, the total demanded drive torque (TQ_total) is calculated in step S300. Here, the predetermined low SOC value (SOC_low) may be set to 20% of the full SOC of the battery in one form, and the total demanded drive torque (TQ_total) is calculated by summing up the demanded drive toque (TQ_drive) to meet the driving torque requested by the driver and the charging torque (TQ_charging) to charge the battery in the low SOC condition. Once the total demanded drive torque is calculated in step S300, the multi-mode controller 27 determines a mode operating region based on the total demanded torque and the engine speed (rpm) in steps S320 and S340.

In step S320, the multi-mode controller 27 determines whether the total demanded torque (TQ_total) and the engine speed (rpm) belongs to the EV only mode operating region. If the EV only mode operating region is confirmed, the GDF engine 46 is turned on to charge the battery 50 and the motor-generator 48 drives the HEV. When the total demanded torque (TQ_total) and the engine speed (rpm) is not within the EV only mode operating region, the multi-mode controller 27 further determines whether the total demanded torque (TQ_total) and the engine speed (rpm) is within the Regeneration mode 1 operating region in step S340. If it is determined that the operating condition is within the Regeneration mode 1, the GDF engine is turned on to charge the battery 50. In other words, the torque generated by the GDF engine is only used to run the motor-generator 48 such that the generated electric power charges the battery 50.

Meanwhile, when the total demanded torque (TQ_total) and the engine speed (rpm) is neither within the EV only mode operating region nor within the Regeneration mode 1 operating region, the multi-mode controller 27 turns on the GDF engine 46 to charge the battery 50 and drive the HEV 100 in step S360.

As such, in some forms of the present disclosure, it is possible to enhance fuel efficiency and driving performance of the HEV by providing multiple modes in which the GDF engine 46 and the motor-generator 48 operate, either alone or in combination, based on the demanded engine load and speed.

FIG. 7 illustrates a computing system which may be implemented with the multi-mode controller or other controllers in some forms of the present disclosure. Referring to FIG. 7, the computing system 1000 includes at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Thus, the operations of the methods or algorithms described in connection with the forms disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:
1. A hybrid electric vehicle (HEV) for multiple operation modes, the HEV comprising:
 a gasoline diffusion flame (GDF) combustion engine configured to perform gasoline diffusion flame combustion, wherein:
  the GDF combustion engine comprises at least one direct injector connected to a fuel delivery system, the at least one direct injector configured to directly supply fuel into a combustion chamber of the GDF combustion engine, when the at least one direct injector supplies the fuel into the combustion chamber, the at least one direct injector is configured to inject a first proportion of the fuel as a pilot injection and a second proportion of the fuel as a main injection following the pilot injection, and the pilot injection occurs close to a top dead center (TDC) in a compression stroke and the main injection starts before a power stroke and ends after the TDC in the power stroke;

a motor-generator operatively connected to the GDF combustion engine and configured to selectively drive the HEV with electric power of a battery or to generate electric power to charge the battery; and a multi-mode controller including a processor and configured to receive operating conditions of the GDF combustion engine and the motor-generator and to define a plurality of mode operating regions based on the received operating conditions, wherein the plurality of mode operating regions includes:
an electric vehicle (EV) only mode operating region where the motor-generator drives the HEV,
a GDF mode operating region where the GDF combustion engine operates and drives the HEV while the motor-generator stops, and
a GDF+EV mode operating region where the motor-generator assists the operation of the GDF combustion engine to drive the HEV.

2. The HEV of claim 1, wherein the first proportion of the fuel is ignited through compression ignition and generates a gasoline diffusion flame, and the generated gasoline diffusion flame ignites the second proportion of the fuel to generate driving power in the GDF combustion engine.

3. The HEV of claim 1, wherein:
the received operating conditions includes engine loads and engine speeds of the GDF combustion engine, and
an engine load in the EV only mode operating region is less than an engine load in the GDF mode operating region.

4. The HEV of claim 3, wherein the EV only mode operating region includes an engine start and an idle speed of the GDF combustion engine.

5. The HEV of claim 3, wherein an engine speed and an engine load in the GDF+EV mode operating region are greater than an engine speed and the engine load in the GDF mode operating region.

6. A method of operating a hybrid electric vehicle (HEV) including a controller, a gasoline diffusion flame (GDF) combustion engine and a motor-generator, the method comprising:
driving, with the controller, the HEV in an electric vehicle (EV) only mode in a first mode operating region defined by a first engine load and a first engine speed when a state of charge (SOC) of a battery is greater than a predetermined SOC value;
causing, with the controller, the GDF combustion engine to perform a four-stroke engine cycle and a GDF combustion engine operation in a second mode operating region defined by a second engine load and a second engine speed, wherein the second engine load is greater than the first engine load, and the GDF combustion engine operation includes: injecting a first proportion of the fuel as a pilot injection and a second proportion of the fuel as a main injection following the pilot injection, wherein the pilot injection occurs close to a top dead center (TDC) in a compression stroke and the main injection starts before a power stroke and ends after the TDC in the power stroke; and
causing, with the controller, a motor-generator to assist the GDF combustion engine operation in a third mode operation region defined by a third engine load and a third engine speed, wherein the third engine load is greater than the first engine load and the third engine speed is greater than the second engine speed.

7. The method of claim 6, wherein the first proportion of the fuel is ignited through compression ignition and generates a gasoline diffusion flame, and the generated gasoline diffusion flame ignites the second proportion of the fuel to generate a driving force in the GDF combustion engine.

* * * * *